United States Patent
Lee et al.

(10) Patent No.: US 9,329,737 B2
(45) Date of Patent: May 3, 2016

(54) TOUCH PANEL COMPRISING SENSING ELECTRODES WITH PROTRUSIONS

(71) Applicant: SAMSUNG ELECTRONICS CO., LTD., Suwon-Si, Gyeonggi-Do (KR)

(72) Inventors: Chang-Ju Lee, Suwon-Si (KR); Hyon Jun Choi, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 251 days.

(21) Appl. No.: 14/014,499

(22) Filed: Aug. 30, 2013

(65) Prior Publication Data

US 2014/0098057 A1   Apr. 10, 2014

(30) Foreign Application Priority Data

Oct. 4, 2012 (KR) .................. 10-2012-0110120

(51) Int. Cl.
*G06F 3/044* (2006.01)

(52) U.S. Cl.
CPC ...... *G06F 3/044* (2013.01); *G06F 2203/04103* (2013.01); *G06F 2203/04111* (2013.01); *G06F 2203/04112* (2013.01)

(58) Field of Classification Search
CPC .......... G06F 3/044; G06F 2203/04103; G06F 2203/04111; G06F 2203/04112
USPC .................... 345/173–179; 178/18.01–18.09
See application file for complete search history.

(56) References Cited

U.S. PATENT DOCUMENTS

| | | |
|---|---|---|
| 2009/0315854 A1 | 12/2009 | Matsuo |
| 2010/0079393 A1 | 4/2010 | Dews |
| 2011/0032209 A1* | 2/2011 | Kim .............................. 345/174 |
| 2011/0141038 A1* | 6/2011 | Kuo et al. ..................... 345/173 |
| 2011/0141039 A1 | 6/2011 | Lee |
| 2011/0248953 A1 | 10/2011 | Lee et al. |
| 2011/0273391 A1 | 11/2011 | Bae |
| 2012/0127092 A1* | 5/2012 | Lee .............................. 345/173 |

FOREIGN PATENT DOCUMENTS

| | | |
|---|---|---|
| JP | 2010009456 A | 1/2010 |
| JP | 2010191797 A | 9/2010 |
| JP | 2010244357 | 10/2010 |
| JP | 2010250424 | 11/2010 |
| JP | 2010271782 | 12/2010 |
| JP | 2012053812 | 3/2012 |
| KR | 1020120027956 A | 3/2012 |

* cited by examiner

*Primary Examiner* — Amare Mengistu
*Assistant Examiner* — Stacy Khoo
(74) *Attorney, Agent, or Firm* — Volentine & Whitt, PLLC

(57) ABSTRACT

A touch panel comprises multiple first sensing electrodes constituting multiple rows, wherein the first sensing electrodes in each of the rows are electrically connected to each other, multiple second sensing electrodes constituting multiple columns crossing the rows, wherein the second sensing electrodes in each of the columns are electrically connected to each other, and multiple conductive patterns disposed between the first and second sensing electrodes. Each of the first and second sensing electrodes comprises multiple protrusions protruding outward from a corresponding boundary and multiple concave portions extending inward between the protrusions in a plan view. Pairs of protrusions extending from opposite sides of each of the first and second sensing electrodes are disposed opposite each other and are symmetrical to each other.

20 Claims, 14 Drawing Sheets

TOUCH PANEL COMPRISING SENSING ELECTRODES WITH PROTRUSIONS

CROSS-REFERENCE TO RELATED APPLICATIONS

This application claims priority under 35 U.S.C. §119 to Korean Patent Application No. 10-2012-0110120 filed on Oct. 4, 2012, the subject matter of which is hereby incorporated by reference.

BACKGROUND OF THE INVENTION

The inventive concept relates generally to touch panels. More particularly, certain embodiments of the inventive concept relate to capacitive touch panels having electrodes with perforations.

A touch panel is an input device configured to sense a touch input. For instance, it may sense a user's finger or a stylus at or near a surface of the touch panel. In one common implementation, a touch panel is disposed on a front side of an image display device. Where an input tool is placed in contact with a screen of the touch panel, the touch panel coverts a contact position into an electrical signal. A touch panel can be implemented with any of several different techniques or technologies, such as a resistive overlay technique, a capacitive overlay technique, a surface acoustic wave technique, or an infrared method technique. Additionally, a touch panel can be implemented with multi-touch capability, e.g., using the capacitive overlay technique.

A touch panel implemented with the capacitive overlay technique can be referred to as a capacitive touch panel. A capacitive touch panel typically comprises multiple sensing electrodes. Where a finger or a touch pen comes in contact with the screen of the capacitive touch panel, the capacitive touch panel senses capacitance variation (or electric field variation) between the sensing electrodes and converts a contact position into an electrical signal.

In general, the performance of a capacitive touch panel can be evaluated according to touch sensitivity and touch accuracy. As touch sensitivity becomes higher, response time tends to increase. One way to increase touch sensitivity is by increasing a capacitance and a variation ratio of the capacitance between the sensing electrodes. Where the finger or the touch pen comes in contact with the screen, touch accuracy is defined as an error rate of a real touched position and a contact position calculated by a driving circuit. The touch accuracy may increase with improvements in uniformity of the capacitance variation (or the electric field variation) of a touch region. In view of these and other features of existing technologies, there is a general need for techniques capable of increasing the touch accuracy of capacitive touch panels.

SUMMARY OF THE INVENTION

In one embodiment of the inventive concept, a touch panel comprises multiple first sensing electrodes constituting multiple rows, wherein the first sensing electrodes in each of the rows are electrically connected to each other, multiple second sensing electrodes constituting multiple columns crossing the rows, wherein the second sensing electrodes in each of the columns are electrically connected to each other, and multiple conductive patterns disposed between the first and second sensing electrodes. Each of the first and second sensing electrodes comprises multiple protrusions protruding outward from a corresponding boundary and multiple concave portions extending inward between the protrusions in a plan view. Pairs of protrusions extending from opposite sides of each of the first and second sensing electrodes are disposed opposite each other and are symmetrical to each other.

In another embodiment of the inventive concept, a touch panel comprises multiple first sensing electrodes constituting multiple rows, wherein the first sensing electrodes in each of the rows are connected to each other, and multiple second sensing electrodes constituting multiple columns crossing the rows, wherein the second sensing electrodes in each of the columns are connected to each other. Each of the first and second sensing electrodes has a lozenge-shape in a plan view. The first and second sensing electrodes comprise multiple first protrusions protruding outward from opposite sides of the first and second sensing electrodes, multiple second protrusions protruding outward from vertices of the first and second sensing electrodes, and multiple concave portions depressed inward between the first protrusions and between the first and second protrusions adjacent to each other. The first protrusions of the first sensing electrodes and the first protrusions of the second sensing electrodes are disposed opposite each other and are symmetrical to each other. The concave portions of the first sensing electrodes and the concave portions of the second sensing electrodes are disposed opposite each other and are symmetrical to each other.

In another embodiment of the inventive concept, a touch panel comprises first and second sensing electrodes connected to each other in a first direction via a first connecting electrode, wherein each of the first and second sensing electrodes has a boundary with multiple protrusions, and third and fourth sensing electrodes connected to each other in a second direction and connected to each other in a second direction via a second connecting electrode crossing the first connecting electrode, wherein each of the third and fourth sensing electrodes has a boundary with multiple protrusions disposed opposite corresponding protrusions on the respective boundaries of the first and second sensing electrodes.

These and other embodiments of the inventive concept can potentially improve the touch accuracy and the signal-to-noise ratio of a touch panel by improving uniformity of an electrical field in a touch region.

BRIEF DESCRIPTION OF THE DRAWINGS

The drawings illustrate selected embodiments of the inventive concept. In the drawings, like reference numbers indicate like features.

DETAILED DESCRIPTION

Figure 1:
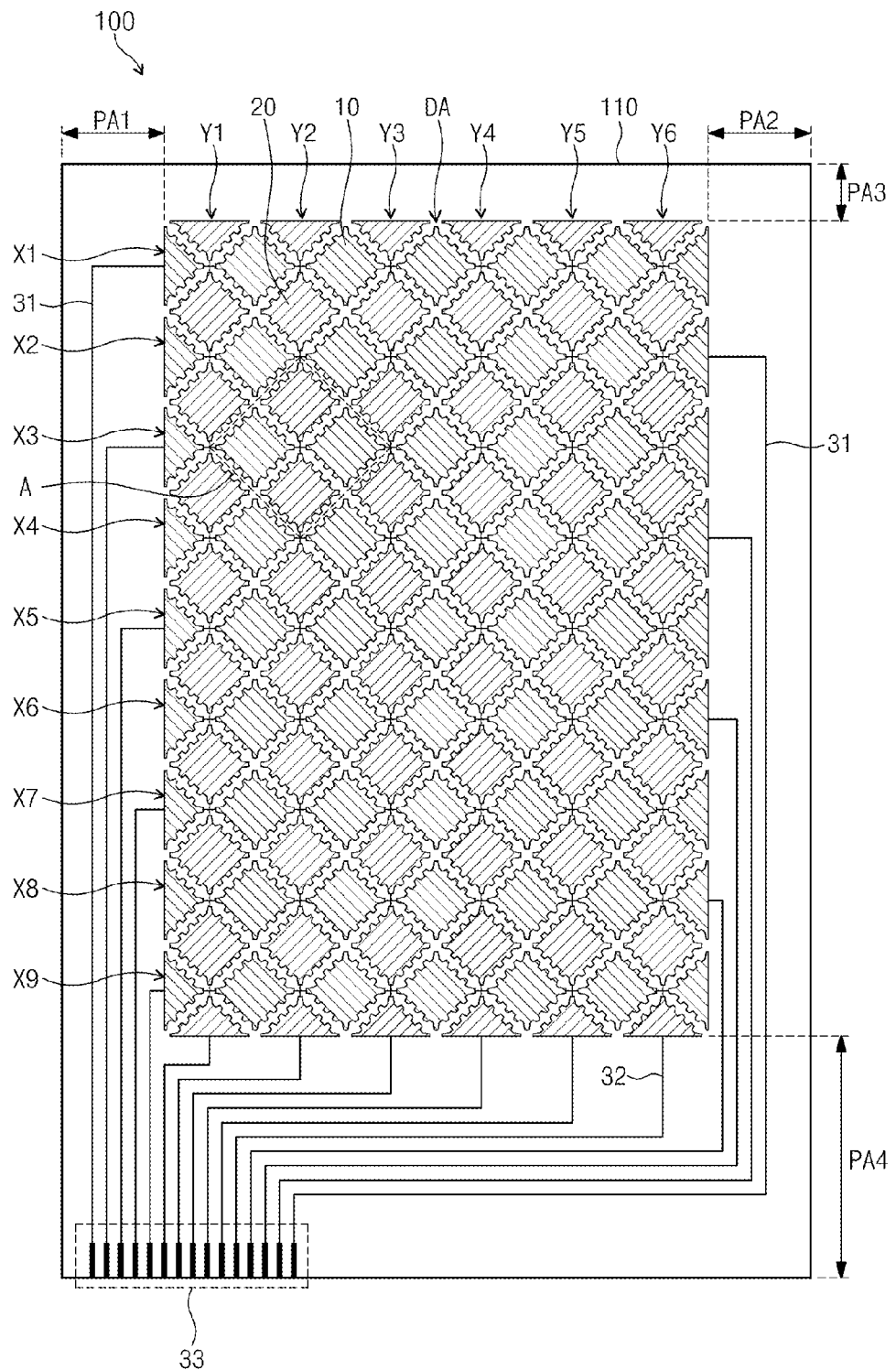
FIG. 1 is a plan view illustrating a touch panel according to an embodiment of the inventive concept.

The drawings illustrate selected embodiments of the inventive concept. In the drawings, like reference numbers indicate like features.

The terminology used herein is for the purpose of describing certain embodiments and is not intended to limit the scope of the inventive concept. As used herein, the singular terms "a," "an" and "the" are intended to encompass the plural forms as well, unless the context clearly indicates otherwise. As used herein, the term "and/or" includes any and all combinations of one or more of the associated listed items. Where an element is referred to as being "connected" or "coupled" to another element, it may be directly connected or coupled to the other element or intervening elements may be present.

Similarly, where an element such as a layer, region or substrate is referred to as being "on" another element, it can be directly on the other element or intervening elements may be present. In contrast, the term "directly" means that there are no intervening elements. Terms such as "comprises", "comprising,", "includes" and/or "including", where used herein, indicate the presence of stated features, integers, steps, operations, elements, and/or components, but do not preclude the presence or addition of one or more other features, integers, steps, operations, elements, components, and/or groups thereof.

Certain embodiments will be described with reference to drawings containing features of specific shapes. The illustrated shapes, however, may vary in various implementations due to design choices, manufacturing variances, and other factors. Accordingly, the shapes are not to be viewed as limiting the inventive concept to idealized forms.

Although the terms first, second, third etc. may be used herein to describe various features, these features should not be limited by these terms. Rather, these terms are only used to distinguish between different features. Thus, a first feature could alternatively be termed a second feature and vice versa without materially altering the meaning of the relevant description.

FIG. 1 is a plan view illustrating a touch panel according to an embodiment of the inventive concept.

Referring to FIG. 1, a touch panel 100 comprises a transparent substrate 110, multiple sensing electrodes 10 and 20 formed on transparent substrate 110, and multiple electrode-connection lines 31 and 32.

Transparent substrate 110 comprises an active region DA and non-active regions PA1, PA2, PA3, and PA4 formed at a peripheral region of active region DA. Non-active regions PA1, PA2, PA3, and PA4 comprise a first non-active region PA1 disposed at a left side of active region DA, a second non-active region PA2 disposed at a right side of active region DA, a third non-active region PA3 disposed at an upside of active region DA, and a fourth non-active region PA4 disposed at a downside of active region DA in a plan view.

Sensing electrodes 10 and 20 are disposed in active region DA. Electrode-connection lines 31 and 32 are disposed in first non-active region PA1, second non-active region PA2, and fourth non-active region PA4. Electrode-connection lines 31 and 32 are connected to sensing electrodes 10 and 20.

Sensing electrodes 10 and 20 have polygonal shapes having the same shape and size as each other in a plan view. Sensing electrodes 10 and 20 comprise multiple protrusions. For example, each of sensing electrodes 10 and 20 may have a triangular shape or a lozenge-shape in a plan view. Each of sensing electrodes 10 and 20 comprises multiple protrusions protruding from its sides and vertices to the outside. Examples of these protrusions will be described in further detail with reference to FIG. 2. The sensing electrodes having the triangular shapes are disposed at a boundary of active region DA. The sensing electrodes having the lozenge-shapes are disposed in a region of active region DA, where the sensing electrodes having the triangular shapes are not disposed. In some embodiments, the sensing electrodes having the lozenge-shapes are surrounded by the sensing electrodes having the triangular shapes in a plan view.

An image light provided from a display panel (not shown) disposed under the touch panel transmits sensing electrodes 10 and 20. For example, sensing electrodes 10 and 20 may be formed of a transparent conductive material including at least one of indium-tin oxide (ITO), indium-zinc oxide (IZO), a conductive polymer (e.g., poly(3,4-ethylenedioxythiophene (PEDOT)), and carbon nanotube (CNT).

Sensing electrodes 10 and 20 comprise multiple first sensing electrodes 10 and multiple second sensing electrodes 20. First sensing electrodes 10 constitute multiple rows X1 to X9 extending in parallel to each other. First sensing electrodes 10 constituting each of rows X1 to X9 are electrically connected to each other. Second sensing electrodes 20 constitute multiple columns Y1 to Y6 extending in parallel to each other in a direction crossing rows X1 to X9. Second sensing electrodes 20 constituting each of columns Y1 to Y6 are electrically connected to each other. A connecting portion of first sensing electrodes 10 crosses a connection portion of second sensing electrodes 20. First sensing electrodes 10 do not overlap with second sensing electrodes 20. First sensing electrodes 10 and second sensing electrodes 20 are alternately disposed.

First sensing electrodes 10 adjacent to each other are electrically connected to each other through first connecting electrodes. Second sensing electrodes 20 adjacent to each other are electrically connected to each other through second connecting electrodes. The first connecting electrode and the second connecting electrode are respectively disposed at different layers from each other with an insulating layer therebetween. The first connecting electrodes cross the second connecting electrodes. The above features will be described in further detail with reference to FIGS. 2 and 3.

For convenience of explanation, FIG. 1 shows nine rows and six columns. However, the inventive concept is not limited thereto. In other embodiments, for instance, first sensing electrodes 10 may form ten or more rows, and second sensing electrodes 20 may constitute seven or more columns.

A capacitance and an electric field may be generated between first and second sensing electrodes 10 and 20. The capacitance and the intensity of the electric field is inversely proportional to a distance between conductors. As the capacitance increases, the intensity of the electric field may increase.

The protrusions formed the opposite sides of each of first and second sensing electrodes 10 and 20 are opposite to each other and are substantially symmetrical. Due to the protrusions, a uniformity of the electric field may be improved. As the uniformity of the electric field is improved, touch accuracy may be improved, as will be described in further detail with reference to FIGS. 2 to 4.

Electrode-connection lines 31 and 32 comprise multiple first electrode-connection lines 31 formed in first and second non-active regions PA1 and PA2 and multiple second electrode-connection lines 32 formed in fourth non-active region PA4. First sensing electrodes 10 constituting each of rows X1 to X9 are electrically connected to each of first electrode-connection lines 31. Second sensing electrodes 20 constituting each of columns Y1 to Y6 are electrically connected to the each of second electrode-connection lines 32.

First and second electrode-connection lines 31 and 32 are formed of the same material as first and second sensing electrodes 10 and 20. First and second electrode-connection lines 31 and 32 are typically formed of a low resistance conductive material such as molybdenum (Mo), silver (Ag), titanium (Ti), copper (Cu), aluminum (Al), and/or molybdenum/aluminum/molybdenum (Mo/Al/Mo). First and second electrode-connection lines 31 and 32 may be connected to an external driving circuit (not shown) such as a position detecting circuit through a pad part 33.

As indicated above, touch panel 100 is a capacitive touch panel. Where a finger or a touch pen comes in contact with a screen of touch panel 100, the capacitance (or the electric field) generated by first and second sensing electrodes 10 and 20 is varied. Capacitance variation at the contact position is transmitted to the driving circuit through first and second electrode-connection lines 31 and 32 and pad part 33, and the capacitance variation is converted into an electrical signal by X and Y input processing circuits (not shown) of the driving circuit, allowing the contact position to be recognized.

Figure 2:
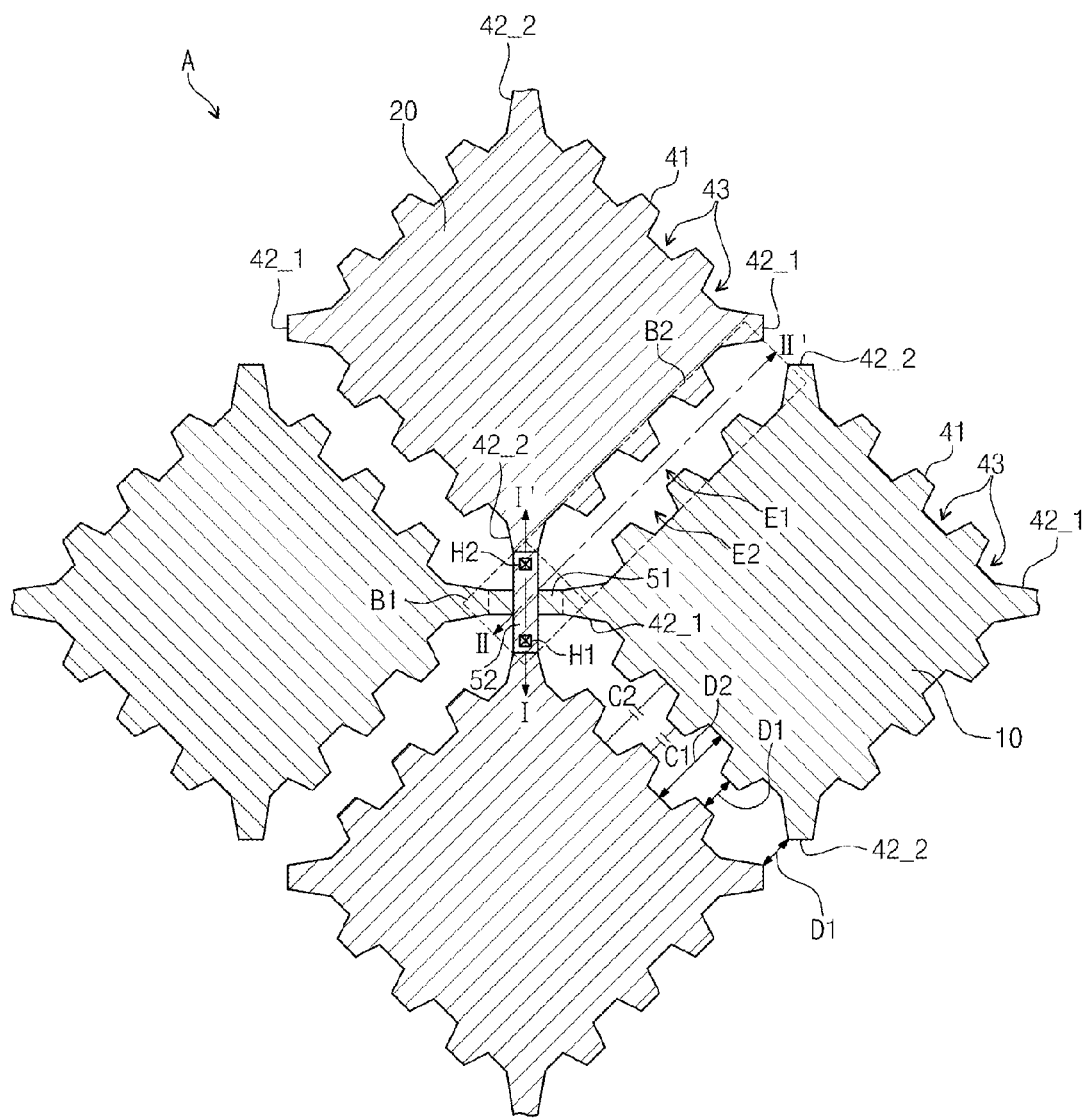
FIG. 2 is an enlarged view of a region 'A' of FIG. 1.
Figure 3:
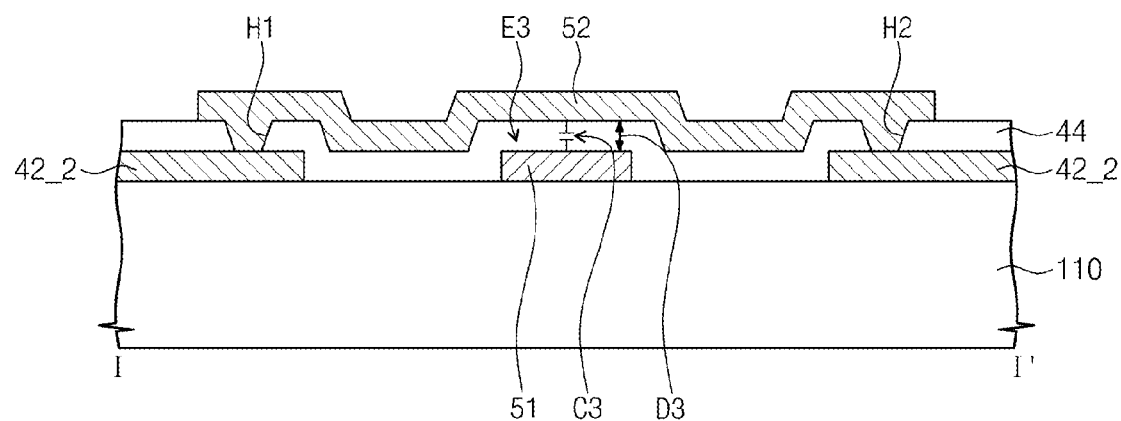
FIG. 3 is a cross-sectional view taken along a line I-I' of FIG. 2.

FIG. 2 is an enlarged view of a region 'A' of FIG. 1, and FIG. 3 is a cross-sectional view taken along a line I-I' of FIG. 2. For convenience of explanation, FIG. 2 illustrates two first sensing electrodes 10 adjacent to each other, two second sensing electrodes 20 adjacent to each other, first connecting electrode 51 connecting first sensing electrodes 10 to each other, and second connecting electrode 52 connecting second sensing electrodes 20 to each other. The structure illustrated in FIG. 2 may be repeatedly arranged in active region DA of touch panel 100. Thus, multiple first connecting electrodes 51 and multiple second connecting electrodes 52 may be disposed in touch panel 100.

Referring to FIGS. 2 and 3, first and second sensing electrodes 10 and 20 have polygonal shapes with substantially the same shape and the same size as each other. In particular, each of first and second sensing electrodes 10 and 20 have the lozenge-shape.

Each of first and second sensing electrodes 10 and 20 comprises multiple protrusions 41, 42_1, and 42_2 protruding outward from a boundary of each of first and second sensing electrodes 10 and 20 and multiple concave portions 43 depressed inward between protrusions 41, 42_1, and 42_2 when viewed from a plan view. Protrusions 41 protruding outward from opposite sides of each of first and second sensing electrodes 10 and 20 face each other and are symmetrical.

First and second sensing electrodes 10 and 20 have the same components except connecting electrodes 51 and 52. Thus, protrusions 41, 42_1, and 42_2 and concave portions 43 of first sensing electrodes 10 and protrusions 41, 42_1, and 42_2 and concave portions 43 of second sensing electrodes 20 are labeled with the same reference numerals.

Protrusions 41, 42_1, and 42_2 comprise first protrusions 41 protruding outward from opposite sides of each of first and second sensing electrodes 10 and 20 and second protrusions 42_1 and 42_2 protruding outward from vertices of each of first and second sensing electrodes 10 and 20 in a plan view.

Concave portions 43 are disposed between first protrusions 41 and between first and second protrusions 41, 42_1, and 42_2 adjacent to each other.

First and second protrusions 41, 42_1, and 42_2 and first and second sensing electrodes 10 and 20 are formed in the same layer at the same time. Each of first and second protrusions 41, 42_1, and 42_2 have a trapezoidal shape in a plan view. First protrusions 41 may have the same size and the same trapezoidal shape. Second protrusions 42_1 and 42_2 have the same size and the same trapezoidal shape. First protrusions 41 of first sensing electrodes 10 and first protrusions 41 of second sensing electrodes 20 are opposite to each other and are substantially symmetrical.

Opposite sides of first protrusions 41 in first and second sensing electrodes 10 and 20 adjacent to each other, respectively, are defined as top-sides of first protrusions 41. A left-side and a right-side of each of first protrusions 41 may be symmetrical. The left-side and the right-side of first protrusion 41 are defined as lateral sides. In other words, each of first protrusions 41 may have the top side and two lateral sides. In some embodiments, the top side of first protrusion 41 is parallel to the side of sensing electrodes 10 or 20 connected to first protrusion 41.

Second protrusions 42_1 and 42_2 of each of first and second sensing electrodes 10 and 20 comprise first sub-protrusions 42_1 arranged in a row direction and second sub-protrusions 42_2 arranged in a column direction. First sub-protrusions 42_1 of first sensing electrodes 10 adjacent to each other are electrically connected to each other through first connecting electrode 51. Second sub-protrusions 42_2 of second sensing electrodes 20 adjacent to each other are electrically connected to each other through second connecting electrode 52. First connecting electrode 51 and second connecting electrode 52 are disposed at levels different from each other, respectively. First and second connecting electrodes 51 and 52 cross each other.

First connecting electrode 51 is a pattern electrode disposed at the same layer as first sensing electrodes 10. The pattern electrode is typically formed of the same material as first and second sensing electrodes 10 and 20 and can be formed simultaneously with first and second sensing electrodes 10 and 20.

Second connecting electrode 52 is a bridge electrode formed at a different layer from second sensing electrodes 20. In more detail, as illustrated in FIG. 3, first connecting electrode 51 and the second sub-protrusions 42_2 of the adjacent second sensing electrodes 20 may be formed on transparent substrate 110 so as to be laterally spaced apart from each other. Although not shown in FIG. 3, first sensing electrodes 10 may also be formed on transparent substrate 110.

An insulating layer 44 is formed on transparent substrate 110 to cover first connecting electrode 51 and the second sub-protrusions 42_2. Second connecting electrode 52 is formed on insulating layer 44. Second connecting electrode 52 is electrically connected to the second sub-protrusions 42_2 of second sensing electrodes 20 adjacent to each other through a first contact hole H1 and a second contact hole H2, which penetrate insulating layer 44. Thus, second sensing electrodes 20 adjacent to each other may be electrically connected to each other in the column direction.

Although first and second sensing electrodes 10 and 20 are described as being formed at the same layer. Under these circumstances, second connecting electrode 52 and second sensing electrodes 20 may be formed concurrently in the same layer. Nevertheless, the inventive concept is not limited thereto. In other embodiments, for instance, first and second sensing electrodes 10 and 20 may be formed at different layers from each other. Concave portions 43 of first sensing electrodes 10 and concave portions 43 of second sensing electrodes 20 may be opposite to each other and may be symmetrical.

A distance between the top side of first protrusion 41 of first sensing electrodes 10 and the top side of first protrusion 41 of second sensing electrodes 20 which are opposite to each other is defined as a first distance D1. A capacitor formed between first protrusions 41 of first and second sensing electrodes 10 and 20 which are opposite to each other is defined as a first capacitor C1. A distance between concave portions 43 of first and second sensing electrodes 10 and 20 which are opposite to each other is defined as a second distance D2. A capacitor formed between concave portions 43 of first and second sensing electrodes 10 and 20 which are opposite to each other is defined as a second capacitor C2.

A distance between first connecting electrode 51 and second connecting electrode 52 which cross each other is defined as a third distance D3. A capacitor between first and second connecting electrodes 51 and 52 crossing each other is defined as a third capacitor C3.

First distance D1 is smaller than second distance D2, and third distance D3 is smaller than first distance D1. A capacitance of a capacitor is inversely proportional to a distance between two conductors adjacent to each other. First and second sensing electrodes 10 and 20 are conductors. A capacitance of first capacitor C1 is greater than a capacitance of second capacitor C2, and a capacitance of third capacitor C3 is greater than a capacitance of first capacitor C1.

Generally, an electric field may be generated in a region where a capacitor is formed. The intensity of the electric field is inversely proportional to a distance between two conductors adjacent to each other.

An electric field generated in first capacitor C1 of first distance D1 is defined as a first electric field E1, an electric field generated in second capacitor C2 of second distance D2 is defined as a second electric field E2, and an electric field generated in third capacitor C3 of third distance D3 is defined as a third electric field E3.

As illustrated in FIG. 2, a region including a crossing region of first and second connecting electrodes 51 and 52 is defined as a first region B1. A region between the opposite sides of first sensing electrodes 10 and second sensing electrodes 20 is defined as a second region B2.

Figure 4:
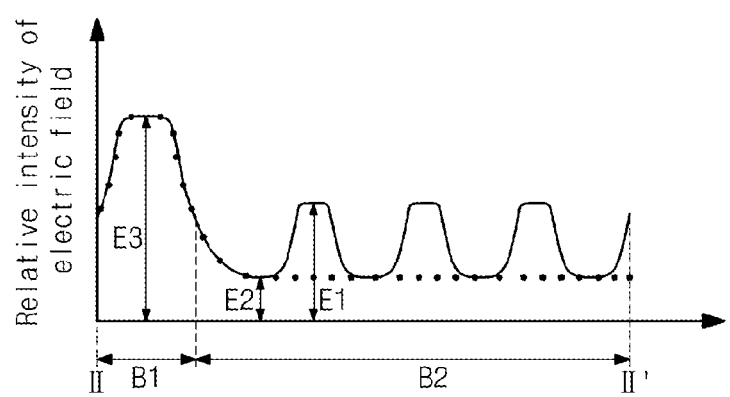
FIG. 4 is a graph illustrating a relative intensity of an electric field along a line II-II' of FIG. 2.

FIG. 4 is a graph illustrating a relative intensity of an electric field taken along a line II-II' of FIG. 2. In FIG. 4, a full line illustrates a relative intensity of an electric field of the touch panel including first protrusions 41. A dot line illustrates a relative intensity of an electric field of a touch panel which does not include first protrusions 41.

Referring to FIG. 4, third electric field E3 may be generated in first region B1. First electric field E1 and second electric field E2 may be repeatedly generated in second region B2. The intensity of first electric field E1 may be greater than the intensity of second electric field E2, and the intensity of third electric field E3 may be greater than the intensity of first electric field E1.

When a finger or a touch pen is moved from a predetermined point to another point of touch panel 100 in the state that the finger or the touch pen is in contact with the touch panel, the touch accuracy may become higher as the uniformities of the capacitance variation and the electric field variation becomes improved. The capacitance and the intensity of the electric field may be proportional to each other with respect to the distance variation between tow conductors. For example, as the distance between the two conductors is reduced, the capacitance and the intensity of the electric field may increase in proportion to each other. Alternatively, as the distance between the two conductors increases, the capacitance and the intensity of the electric field may be reduced in proportion to each other. Hereinafter, the touch accuracy will be described based on the intensity of the electric field. The intensity of the electric field is defined as a magnitude of the capacitance in a region where the capacitor is formed.

The variation of the electric field is defined as a difference value between the intensity of the electric field between first and second sensing electrodes 10 and 20 when the finger or touch pen is not in contact with touch panel 100 and the intensity of the electric field between first and second sensing electrodes 10 and 20 when the finger or touch pen is in contact with touch panel 100.

When the finger or touch pen is moved along line II-II' of FIG. 2 in the state it is in contact with touch panel 100, the intensity of the electric field should be uniform in order that the variation of the electric field is substantially uniform. When the finger or touch pen is moved along line II-II' of FIG. 2 in the state it is in contact with touch panel 100, the intensity of the electric field of first region B1 should be substantially equal to the intensity of the electric field of second region B2 in order that the variation of the electric field is substantially uniform. In an ideal case, the intensity of the electric field may be a linear characteristic along line II-II' of FIG. 2. When the intensity of the electric field of first region B1 is substantially equal to the intensity of the electric field of second region B2, the uniformity of the electric field of active region DA of touch panel 100 may be best because the same electric field may be distributed throughout active region DA of touch panel 100. However, because it may be difficult that the intensity of the electric field has the linear characteristic, it is important to improve the uniformity of the electric field generated in active region DA of touch panel 100.

If first and second sensing electrodes 10 and 20 do not include first protrusions 41, third electric field E3 may be generated in first region B1 and second electric field E2 may be generated in second region B2, as illustrated in FIG. 4. In other words, if first and second sensing electrodes 10 and 20 do not include first protrusions 41, second electric field E2 and third electric field E3 may be distributed in active region DA of touch panel 100.

If first and second sensing electrodes 10 and 20 include first protrusions 41 according to embodiments of the inventive concept, first electric field E1 and second electric field E2 may be repeatedly generated in second region B2. The intensity of first electric field E1 is greater than the intensity of second electric field E2 and is smaller than the intensity of third electric field E3. In other words, if first and second sensing electrodes 10 and 20 include first protrusions 41 according to embodiments of the inventive concept, first electric field E1, second electric field E2, and third electric field E3 may be distributed in active region DA of touch panel 100.

If the finger touches touch panel 100, a touch area may be substantially greater than an area of one of first and second sensing electrodes 10 and 20. Thus, the intensity of the electric field is defined as a mean value of the intensities of the electric fields generated in a region of touch panel 100 which corresponds to the touch area.

As a difference between a maximum mean value and a minimum mean value of the intensities of the electric fields is reduced, the touch accuracy may become improved. In other words, as a difference between the mean value of maximum values of the intensities of the electric fields and the mean value of minimum values of the intensities of the electric fields is reduced, the variation of the electric field may become constant. For example, if only the second and third electric fields E2 and E3 are generated in active region DA of touch panel 100, the maximum value corresponds to the intensity of third electric field E3 and the minimum value corresponds to the intensity of second electric field E2. The difference between the mean value of maximum values of the intensities of the electric fields and the mean value of minimum values of the intensities of the electric fields is defined as a difference between the intensity of second electric field E2 and the intensity of third electric field E3.

If the first, second, and third electric fields E1, E2, and E3 are generated in touch panel 100, the mean value of the maximum values of the intensities of the electric fields corresponds to a mean value of the intensities of the first and third electric fields E1 and E3, and the mean value of the minimum values of the intensities of the electric fields corresponds to the intensity of second electric field E2. The difference between the mean value of the maximum values of the intensities of the electric fields and the mean value of the minimum values of the intensities of the electric fields is defined as a difference between the mean value of the intensities of the first and third electric fields E1 and E3 and the intensity of second electric field E2.

Thus, the difference between the mean value of the maximum values and the mean value of the minimum values of the electric fields including the first, second, and third electric fields E1, E2, and E3 may be smaller the difference between the mean value of the maximum values and the mean value of the minimum values of the electric fields including only the second and third electric fields E2 and E3. As the uniformity of the electric field described above becomes improved, the difference between the mean value of the maximum values and the mean value of the minimum values of the electric fields may become smaller. If the difference between the mean value of the maximum values and the mean value of the minimum values of the electric fields is zero (0), the intensities of the electric fields generated in active region DA of touch panel 100 may be equal to each other. In this case, the electric fields may be ideally uniform in active region DA, such that the uniformity of the electric fields may be best.

The uniformity of the electric field may be more improved when the first, second, and third electric fields E1, E2, and E3 are distributed in active region DA of touch panel 100 than when the second and third electric fields E2 and E3 are distributed in active region DA of touch panel 100. In other words, the uniformity of electric field may be more improved when multiple different electric fields are distributed in active region DA that when one electric field is generated in active region DA. Thus, the electric field may be more uniformly distributed in active region DA when first protrusions 41 are formed in touch panel 100 than when first protrusions 41 are not formed in touch panel 100. As the electric fields become uniformly distributed, the uniformity of the electric field of active region DA may be more improved and the touch accuracy may be more improved.

If the finger or touch pen comes in contact with touch panel 100, the electric field may be varied by first and second sensing electrodes 10 and 20. The variation of the electric field in the contact position may be transmitted to the driving circuit through first and second electrode-connection lines 31 and 32 and pad part 33. Because the variation of the electric field may be converted into an electrical signal by the Y and Y input processing circuits of the driving circuit, the contact position may be recognized.

A touch panel not including first protrusions 41 is defined as a diamond pattern. Because touch panel 100 comprises first and second sensing electrodes 10 and 20 including first protrusions 41, it may improve the uniformity of the electric field of touch panel 100 compared to a simple diamond pattern. As a result, the touch accuracy of touch panel 100 may be improved.

Figure 5:
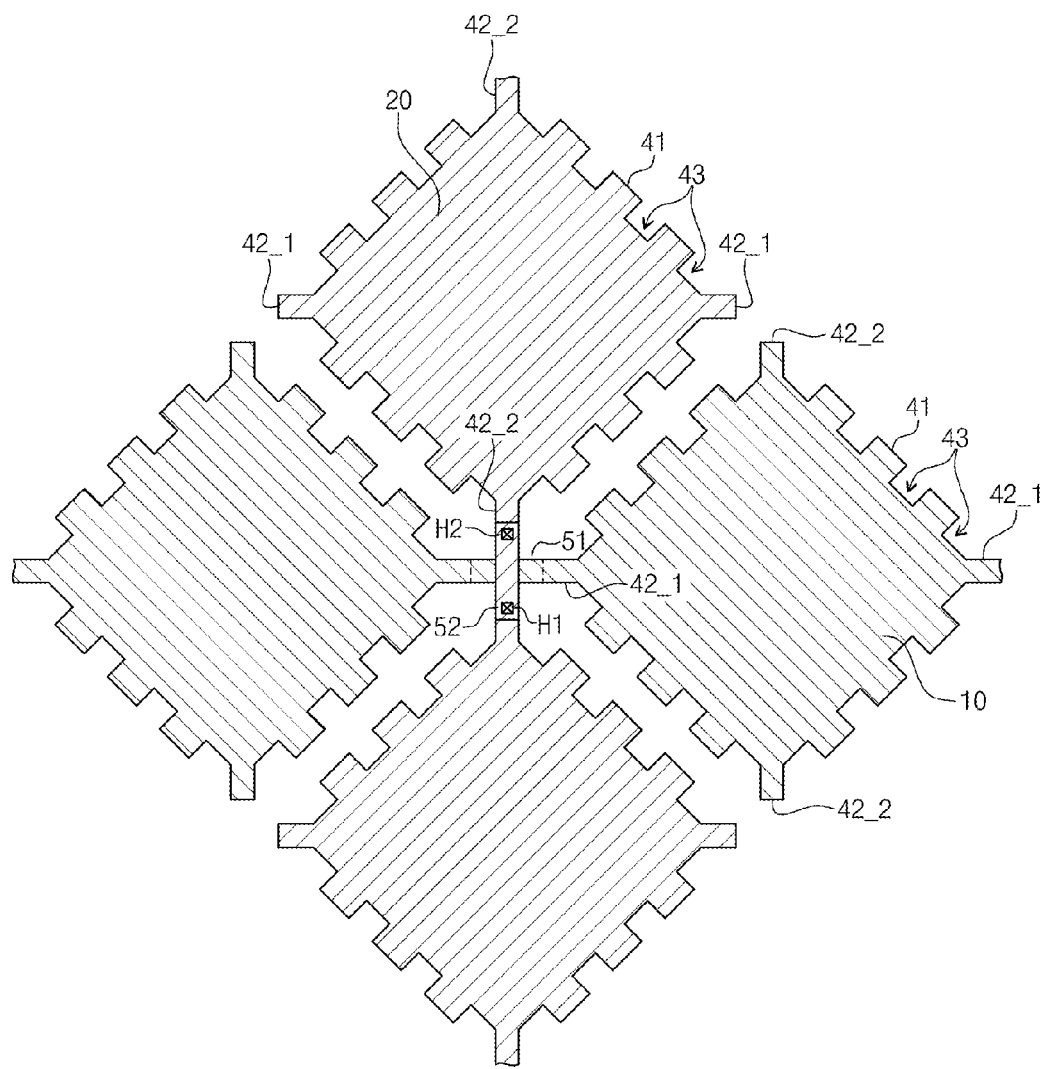
FIGS. 5 to 7 are plan views illustrating examples of various shapes of first protrusions of a touch panel according to embodiments of the inventive concept.
Figure 6:
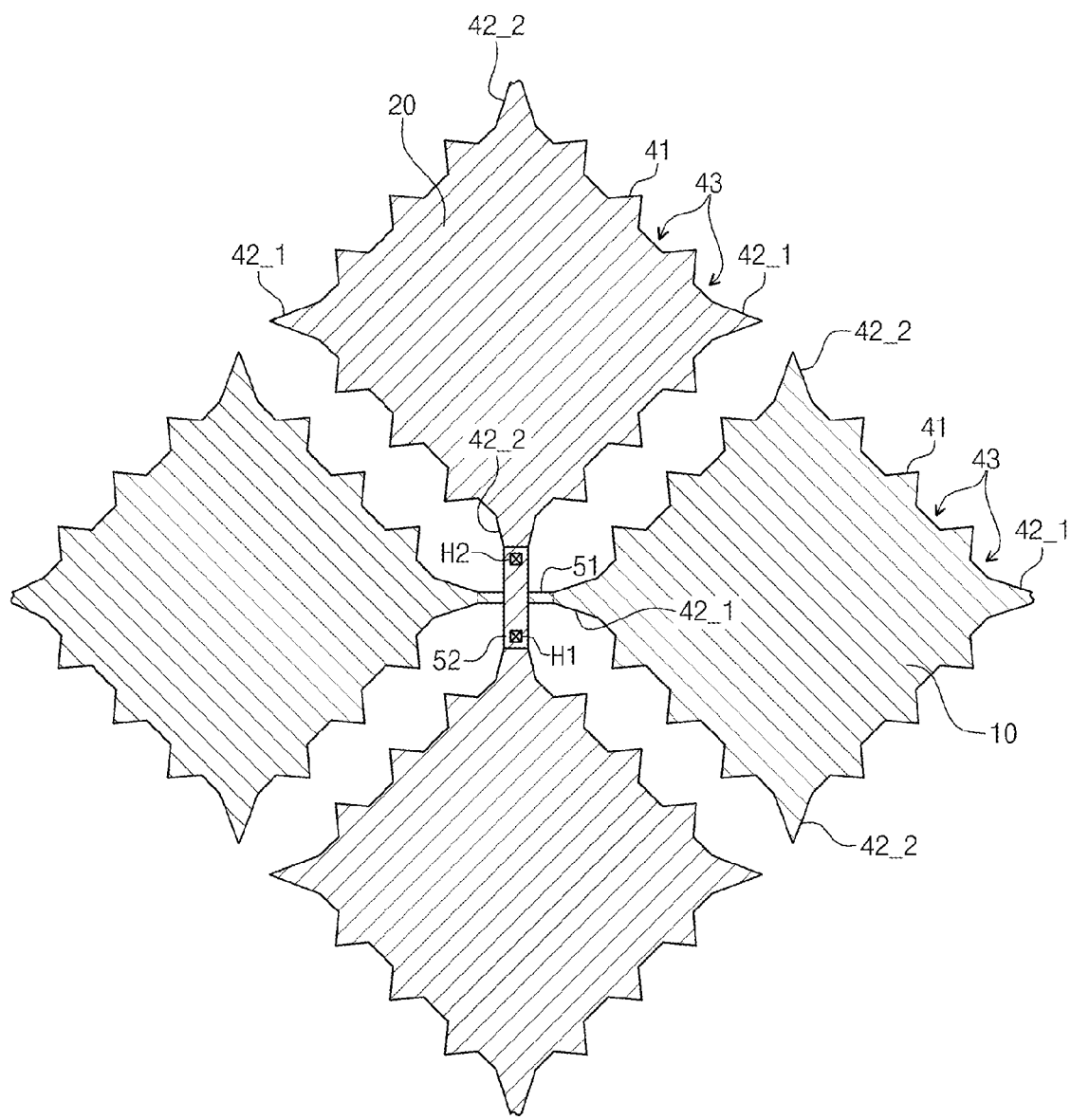
Figure 7:
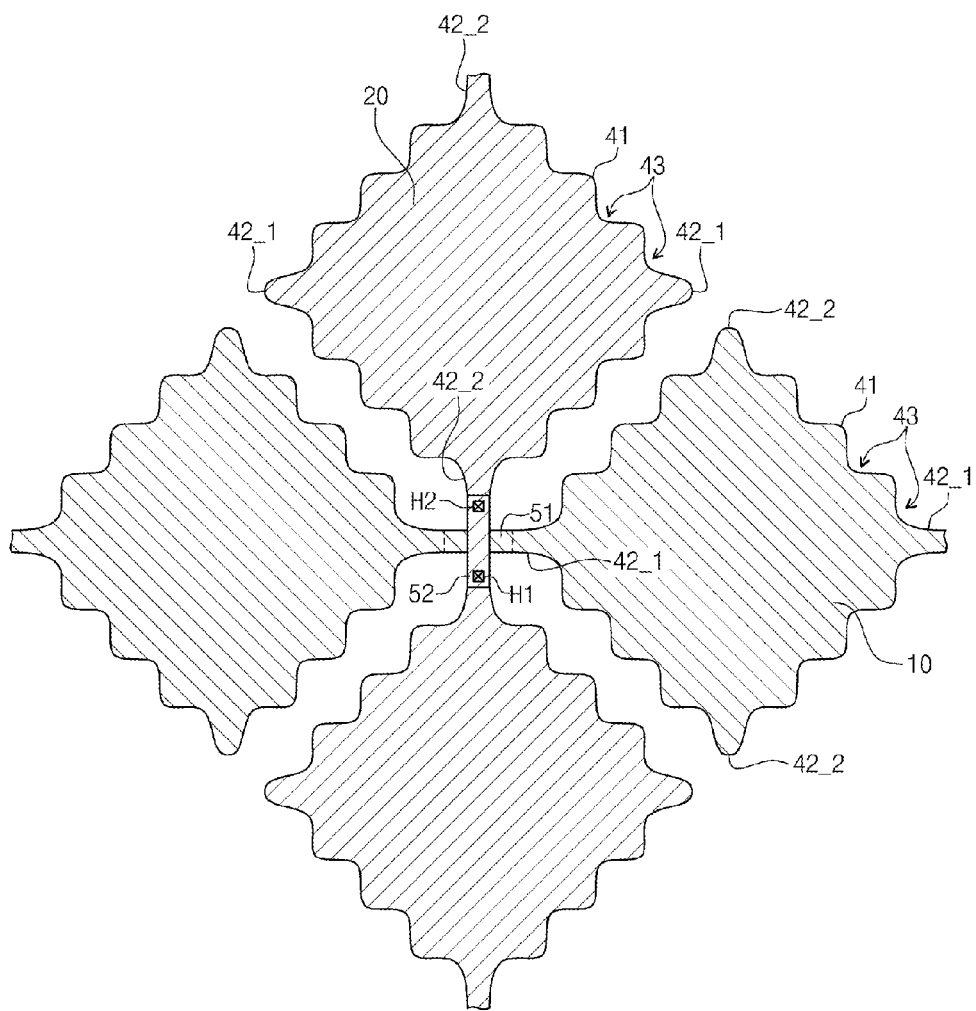

FIGS. 5 to 7 are plan views illustrating examples of various shapes of first protrusions of a touch panel according to an embodiment of the inventive concept.

Referring to FIGS. 5 to 7, each of first protrusions 41 has one of a polygonal shape and a curved shape. In some embodiments, each of first protrusions 41 has a quadrilateral shape, as illustrated in FIG. 5. In some other embodiments, each of first protrusions 41 has a triangular shape, an illustrated in FIG. 6. In still other embodiments, each of first protrusions 41 has a curved shape, an illustrated in FIG. 7.

Figure 8:
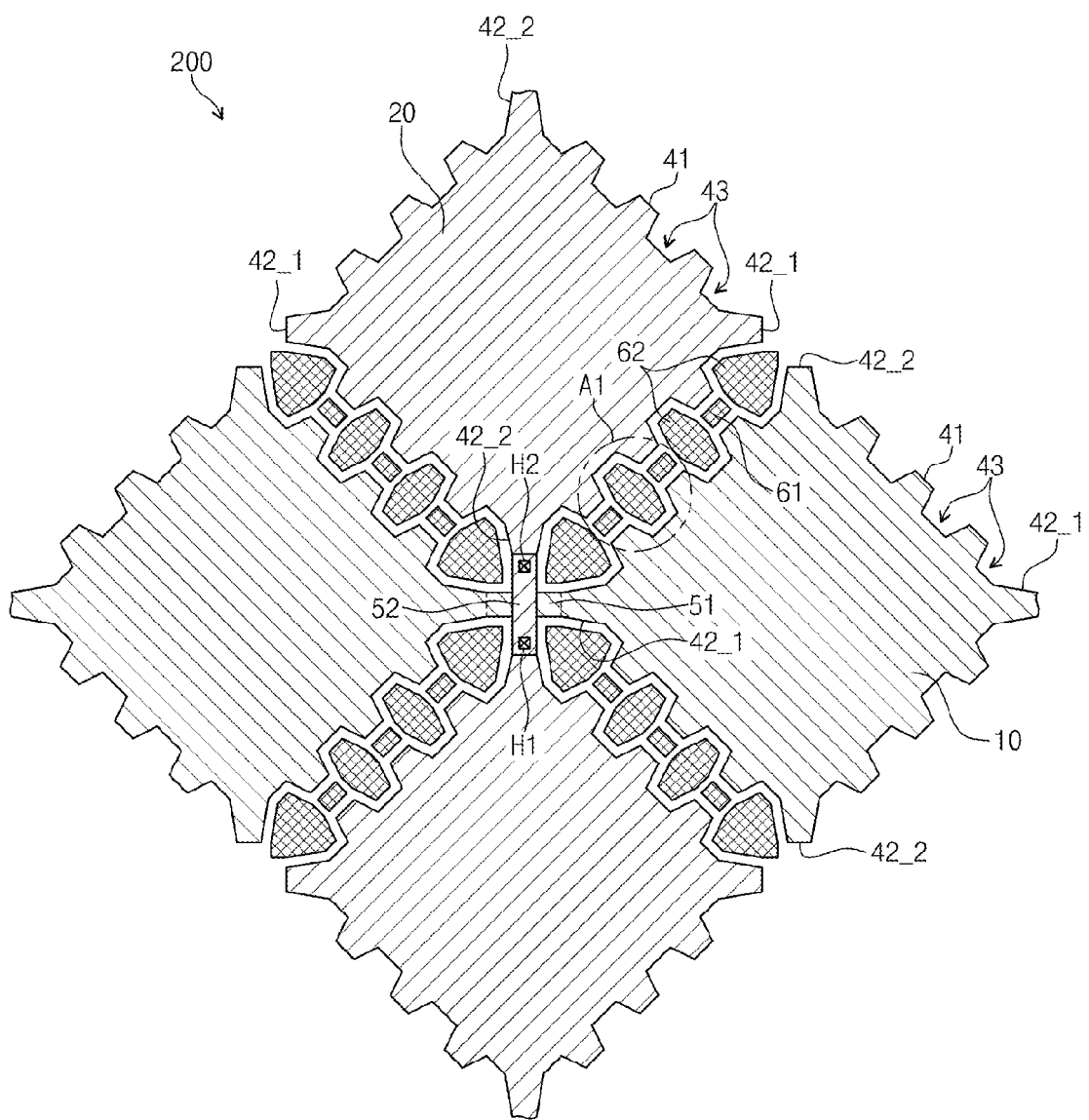
FIG. 8 is a plan view illustrating sensing electrodes of a touch panel according to an embodiment of the inventive concept.
Figure 9:
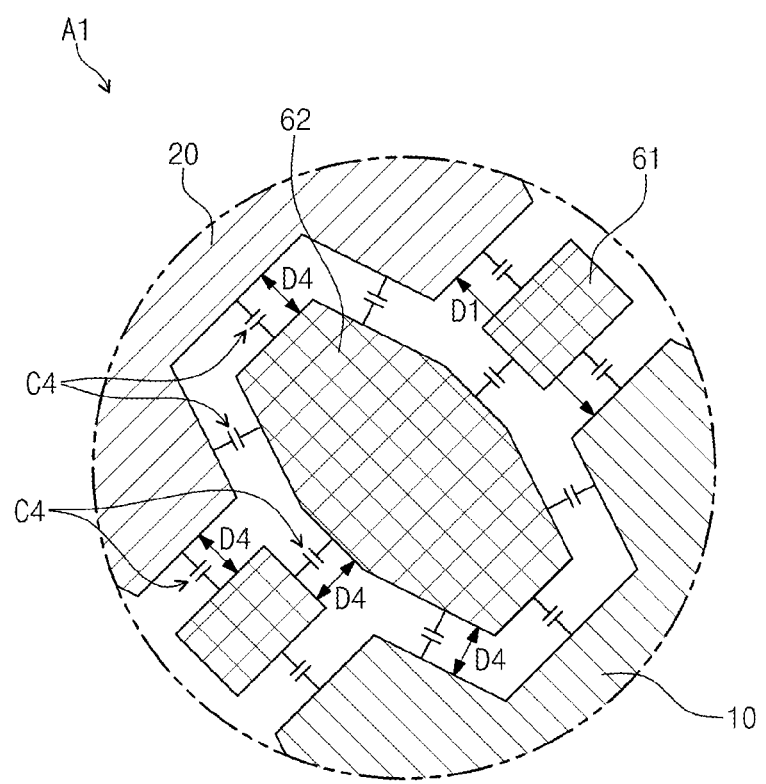
FIG. 9 is an enlarged view of a region 'A1' of FIG. 8.

FIG. 8 is a plan view illustrating sensing electrodes of a touch panel according to an embodiment of the inventive concept. FIG. 9 is an enlarged view of a region 'A1' of FIG. 8. For convenience of explanation, FIG. 8 illustrates two first sensing electrodes 10 adjacent to each other, two second sensing electrodes 20 adjacent to each other, first connecting electrode 51 connecting first sensing electrodes 10 to each other, and second connecting electrode 52 connecting second sensing electrodes 20 to each other. However, the structure illustrated in FIG. 8 may be repeatedly arranged in the active region of the touch panel.

Referring to FIG. 8, a touch panel 200 comprises conductive patterns 61 and 62 disposed between opposite first protrusions 41 of first and second sensing electrodes 10 and 20 and between opposite concave portions 43 of first and second sensing electrodes 10 and 20. Other features of touch panel 200 are the same as corresponding features of touch panel 100. Accordingly, the following description will focus on differences between touch panel 100 and touch panel 200.

Touch panel 200 comprises first sensing electrodes 10, second sensing electrodes 20, and multiple conductive patterns 61 and 62 between the opposite sides of first sensing electrodes 10 and second sensing electrodes 20. First and second sensing electrodes 10 and 20 may be the same as first and second sensing electrodes 10 and 20 of touch panel 100. Thus, further descriptions of first and second sensing electrodes 10 and 20 will be omitted.

Conductive patterns 61 and 62 comprise multiple first conductive patterns 61 and multiple second conductive patterns 62. Each of first conductive patterns 61 is disposed between first protrusion 41 of first sensing electrodes 10 and first protrusion 41 of second sensing electrodes 20 that are opposite to each other. In other words, each of first conductive patterns 61 is disposed between the top sides of first protrusions 41 of first and second sensing electrodes 10 and 20, which are opposite to each other. First conductive patterns 61 are spaced apart from the top sides of first protrusions 41 at an interval of a predetermined distance.

Each of second conductive patterns 62 is disposed between concave portions 43 of first and second sensing electrodes 10 and 20, which are opposite to each other. In more detail, each of second conductive patterns 62 is spaced apart from each of inner sides of concave portions 43 opposite to each other at an interval of a predetermined distance. Second conductive patterns 62 are spaced apart from lateral sides of first protrusions 41 at an interval of a predetermined distance.

First conductive patterns 61 and second conductive patterns 62 are spaced apart from each other and are alternately and repeatedly arranged. In some embodiments, first conductive patterns 61 and second conductive patterns 62 are alternately and repeatedly arranged at equal intervals. However, the inventive concept is not limited thereto. For instance, in alternative embodiments, first conductive patterns 61 and second conductive patterns 62 may be alternately and repeatedly arranged at different intervals.

A distance between the top side of first protrusion 41 and first conductive pattern 61 that are adjacent to each other is substantially equal to a distance between second conductive pattern 62 and the inner side of concave portion 43 that are adjacent to each other, a distance between second conductive pattern 62 and the lateral side of first protrusion 41 that are adjacent to each other, and a distance between the first and second conductive patterns 61 and 62 adjacent to each other. Each of these distances is defined as a fourth distance D4. Nevertheless, the inventive concept is not limited to this configuration. In alternative embodiments, for instance, the distance between the top side of first protrusion 41 and first conductive pattern 61, the distance between second conductive pattern 62 and the inner side of concave portion 43, the distance between second conductive pattern 62 and the lateral side of first protrusion 41, and the distance between the first and second conductive patterns 61 and 62 may be configured to be different from each other. Moreover, fourth distance D4 may be smaller than first distance D1 between the top sides of first protrusions 41 adjacent to each other.

A fourth capacitor C4 is formed between the top side of first protrusion 41 and first conductive pattern 61 that are adjacent to each other, between second conductive pattern 62 and the inner side of concave portion 43 that are adjacent to each other, between second conductive pattern 62 and the lateral side of first protrusion 41 that are adjacent to each other, and between the first and second conductive patterns 61 and 62 adjacent to each other.

The capacitance of the capacitor is inversely proportional to a distance between conductors and in proportion to a length of an overlapping region of the conductors. As the length of the overlapping region increases, an area of each of the conductors increases. First sensing electrodes 10, second sensing electrodes 20, first conductive pattern 61, and second conductive patterns 62 is defined as the conductors of the capacitors.

As described above, fourth distance D4 may be smaller than first distance D1. A total length of the overlapping regions of first sensing electrodes 10, second sensing electrodes 20, first conductive patterns 61, and second conductive patterns 62 is longer than a total length of the overlapping regions between first and second sensing electrodes 10 and 20 illustrated in FIG. 2. As a result, a total capacitance of the capacitors between first and second sensing electrodes 10 and 20 of touch panel 200 may increase.

Generally, as the capacitance of a capacitor increases, an impedance of a circuit may become reduced. As the impedance decreases, a signal-to-noise ratio (SNR) may be improved. The capacitance of the capacitors formed between first and second sensing electrodes 10 and 20 may increase in touch panel 200, such that the SNR of touch panel 200 may be improved.

An electric field may be generated in each of the regions where fourth capacitors C4 are formed. In other words, the electric fields may be dispersed in the regions where fourth capacitors C4 are formed. As described above, when the electric fields are dispersed in multiple regions, the uniformity of the electric field may be improved. Touch panel 200 may improve the uniformity of the electric field to improve the touch accuracy.

Figure 10:
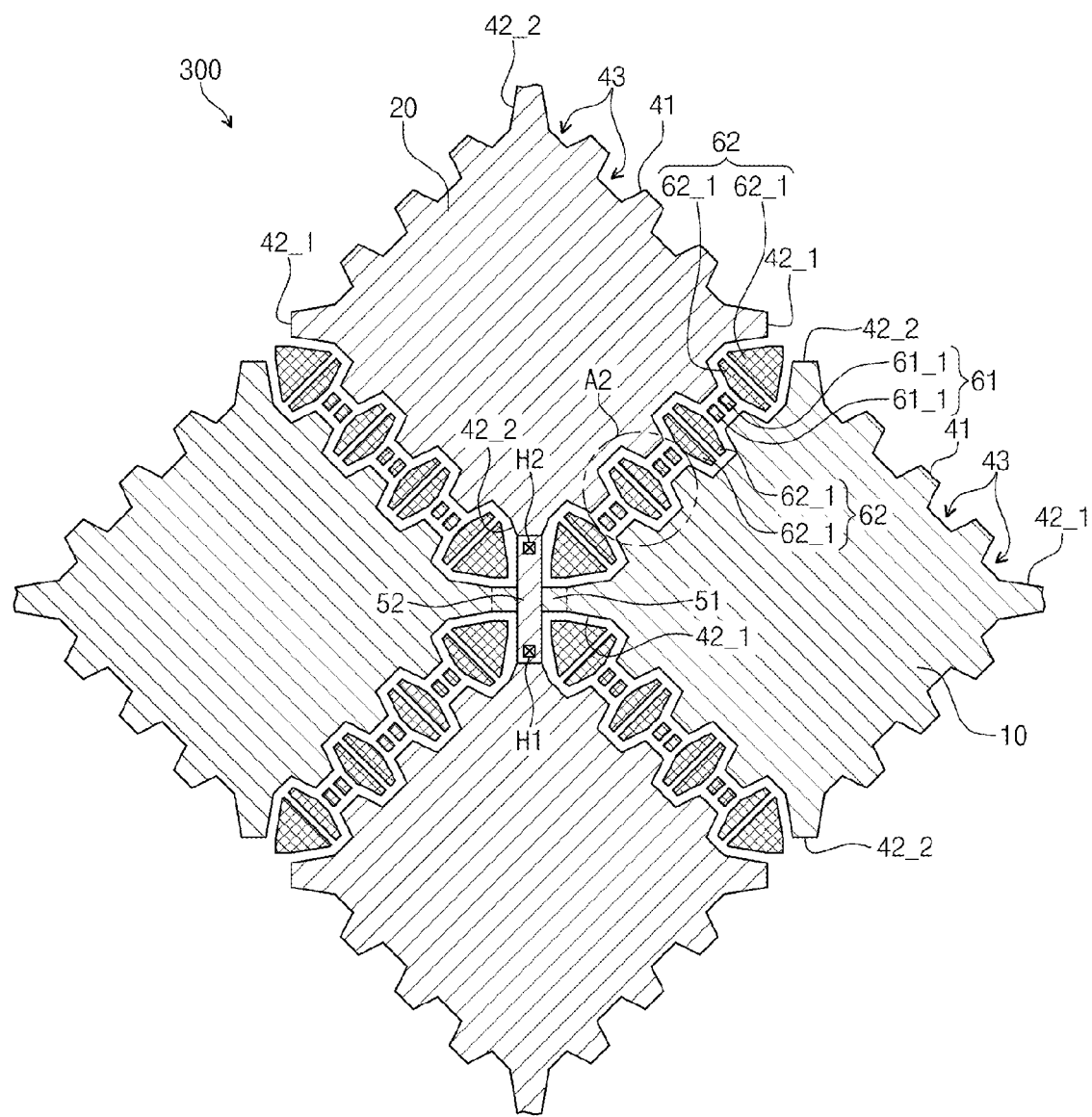
FIG. 10 is a plan view illustrating sensing electrodes of a touch panel according to an embodiment of the inventive concept.
Figure 11:
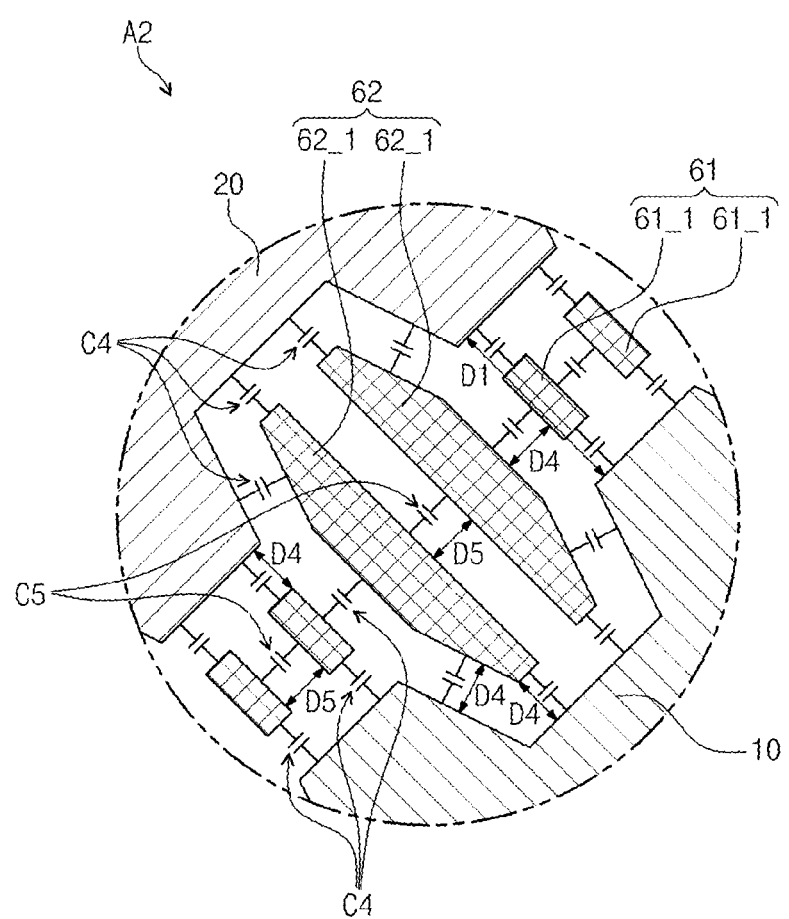
FIG. 11 is an enlarged view of a region 'A2' of FIG. 10.

FIG. 10 is a plan view illustrating sensing electrodes of a touch panel according to an embodiment of the inventive concept, and FIG. 11 is an enlarged view of a region 'A2' of FIG. 10. For convenience of explanation, FIG. 10 illustrates two first sensing electrodes 10 adjacent to each other, two second sensing electrodes 20 adjacent to each other, first connecting electrode 51 connecting first sensing electrodes 10 to each other, and second connecting electrode 52 connecting second sensing electrodes 20 to each other. However, the structure illustrated in FIG. 10 may be repeatedly arranged in the active region of a touch panel 300. In the example of FIG. 10, a touch panel 300 comprises conductive patterns, and further comprises other features similar to those of touch panel 100 or 200. For the sake of brevity, the following description will focus on differences between touch panel 300 and touch panel 100 and 200.

Referring to FIGS. 10 and 11, touch panel 300 comprises first sensing electrodes 10 and second sensing electrodes 20, and multiple conductive patterns 61 and 62 disposed between opposite sides of first and second sensing electrodes 10 and 20.

Conductive patterns 61 and 62 comprise multiple first conductive patterns 61 and multiple second conductive patterns 62. Each of first conductive patterns 61 is disposed between first protrusion 41 of first sensing electrodes 10 and first protrusion 41 of second sensing electrodes 20 that are opposite to each other. In more detail, each of first conductive patterns 61 is disposed between the top sides of first protrusions 41 of first and second sensing electrodes 10 and 20, which are opposite to each other. In some embodiments, first conductive pattern 61 is spaced apart from each of the top sides of first protrusions 41 opposite to each other at an interval of fourth distance D4.

Each of second conductive patterns 62 is disposed between concave portions 43 of first and second sensing electrodes 10 and 20, which are opposite to each other. For example, second conductive pattern 62 is spaced apart from each of the inner sides of concave portions 43 facing each other at an interval of fourth distance D4. Second conductive pattern 62 is also spaced apart from the lateral side of first protrusion 41 adjacent thereto at an interval of fourth distance D4. First and second conductive patterns 61 and 62 are spaced apart from each other at an interval of fourth distance D4. Nevertheless, the inventive concept is not limited to the above dimensions. In alternative embodiments, for instance, the distance between the top side of first protrusion 41 and first conductive pattern 61, the distance between second conductive pattern 62 and the inner side of concave portion 43, the distance between second conductive pattern 62 and the lateral side of first protrusion 41, and the distance between the first and second conductive patterns 61 and 62 may be different from each other.

Each of first conductive patterns 61 comprises multiple first sub-conductive patterns 61_1. For example, each of first conductive patterns 61 may include two first sub-conductive patterns 61_1. The two first sub-conductive patterns 61_1 adjacent to each other may be spaced apart from each other. For example, the two adjacent first sub-conductive patterns 61_1 may be spaced apart from each other at an interval of a fifth distance D5. In FIG. 10, each of first conductive patterns 61 comprises two first sub-conductive patterns 61_1. However, the inventive concept is not limited thereto. In other embodiments, for instance, each of first conductive patterns 61 may include three or more first sub-conductive patterns 61_1.

Each of second conductive patterns 62 comprises multiple second sub-conductive patterns 61_2. For example, each of second conductive patterns 62 may comprise two of second sub-conductive patterns 61_2. The two second sub-conductive patterns 61_2 adjacent to each other may be spaced apart from each other. For example, the two adjacent second sub-conductive patterns 61_2 may be spaced apart from each other at an interval of fifth distance D5. In FIG. 10, each of second conductive patterns 62 comprises the two second sub-conductive patterns 61_2. However, the inventive concept is not limited thereto. In other embodiments, for instance, each of second conductive patterns 62 may include three or more second sub-conductive patterns 61_2.

The distance between first sub-conductive patterns 61_1 adjacent to each other may be substantially equal to the distance between second sub-conductive patterns 61_2 and is defined as fifth distance D5. However, the inventive concept is not limited thereto. In another embodiment, for instance, the distance between first sub-conductive patterns 61_1 adjacent to each other may be different from the distance between second sub-conductive patterns 61_2.

Fifth distance D5 is substantially equal to fourth distance D4. However, the inventive concept is not limited thereto. In another embodiment, for instance, fifth distance D5 is different from fourth distance D4. In still another embodiment, the distance between first conductive pattern 61 and first protrusion 41 adjacent to each other, the distance between the inner side of concave portion 43 and second conductive pattern 62 adjacent to each other, the distance between the first and second conductive patterns 61 and 62 adjacent to each other, the distance between first sub-conductive patterns 61_1 adjacent to each other, and the distance between second sub-conductive patterns 61_2 adjacent to each other may be different from each other.

Fifth capacitors C5 are formed between the adjacent first sub-conductive patterns 61_1 and between the adjacent second sub-conductive patterns 61_2, respectively.

An electric field is generated in each of regions where fourth capacitors C4 and fifth capacitors C5 are formed. In other words, the electric fields may be generated to be dispersed in the regions where fourth and fifth capacitors C4 and C5 are formed. As described above, where the electric fields are dispersed in multiple regions, the uniformity of the electric field may be improved. Thus, touch panel 300 may improve the uniformity of the electric field to improve the touch accuracy.

Figure 12:
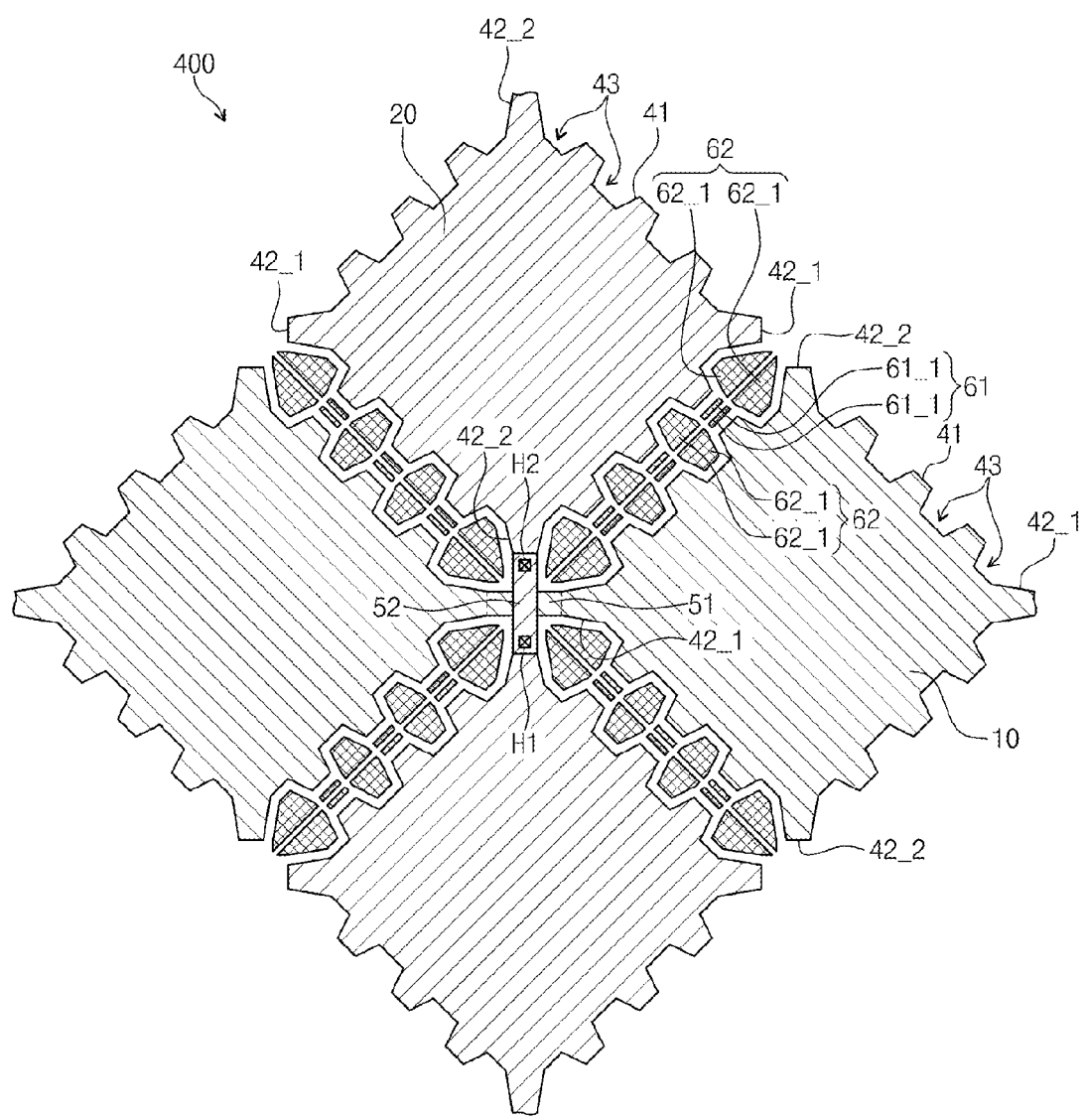
FIG. 12 is a plan view illustrating sensing electrodes of a touch panel according to an embodiment of the inventive concept.

FIG. 12 is a plan view illustrating sensing electrodes of a touch panel according to an embodiment of the inventive concept. For convenience of explanation, FIG. 12 illustrates two first sensing electrodes 10 adjacent to each other, two second sensing electrodes 20 adjacent to each other, first connecting electrode 51 connecting first sensing electrodes 10 to each other, and second connecting electrode 52 connecting second sensing electrodes 20 to each other. However, the structure illustrated in FIG. 12 may be repeatedly arranged in the active region of a touch panel 400 according to the present fourth embodiment. Features of touch panel 400 other than the conductive patterns may be the same as corresponding features of touch panel 300. Accordingly, the following description will focus on differences between touch panel 300 and touch panel 400.

Referring to FIG. 12, conductive patterns 61 and 62 of touch panel 400 comprise multiple first conductive patterns 61 and multiple second conductive patterns 62. Each of first conductive patterns 61 comprises multiple first sub-conductive patterns 61_1. Each of second conductive patterns 62 comprises multiple second sub-conductive patterns 62_2.

First sub-conductive patterns 61_1 of touch panel 300 are arranged in a left and right direction in a plan view. Alternatively, first sub-conductive patterns 61_1 of touch panel 400 are arranged in an up and down direction in a plan view. Similarly, second sub-conductive patterns 62_1 of touch panel 300 are arranged in the left and right direction, but second sub-conductive patterns 61_2 of touch panel 400 are arranged in the up and down direction in a plan view. Other features of touch panel 400 may be the same as corresponding features of touch panel 300, so further descriptions thereof are omitted. Fifth capacitors C5 are formed between first sub-conductive patterns 61_1 adjacent to each other and between second sub-conductive patterns 62_1 adjacent to each other, respectively.

An electric field is generated in each of regions where fourth capacitors C4 and fifth capacitors C5 are formed. In other words, the electric fields may be generated to be dispersed in the regions where fourth and fifth capacitors C4 and C5 are formed. As described above, where the electric fields are dispersed in multiple regions, the uniformity of the electric field may be improved. Thus, touch panel 400 may improve the uniformity of the electric field to improve the touch accuracy.

Figure 13:
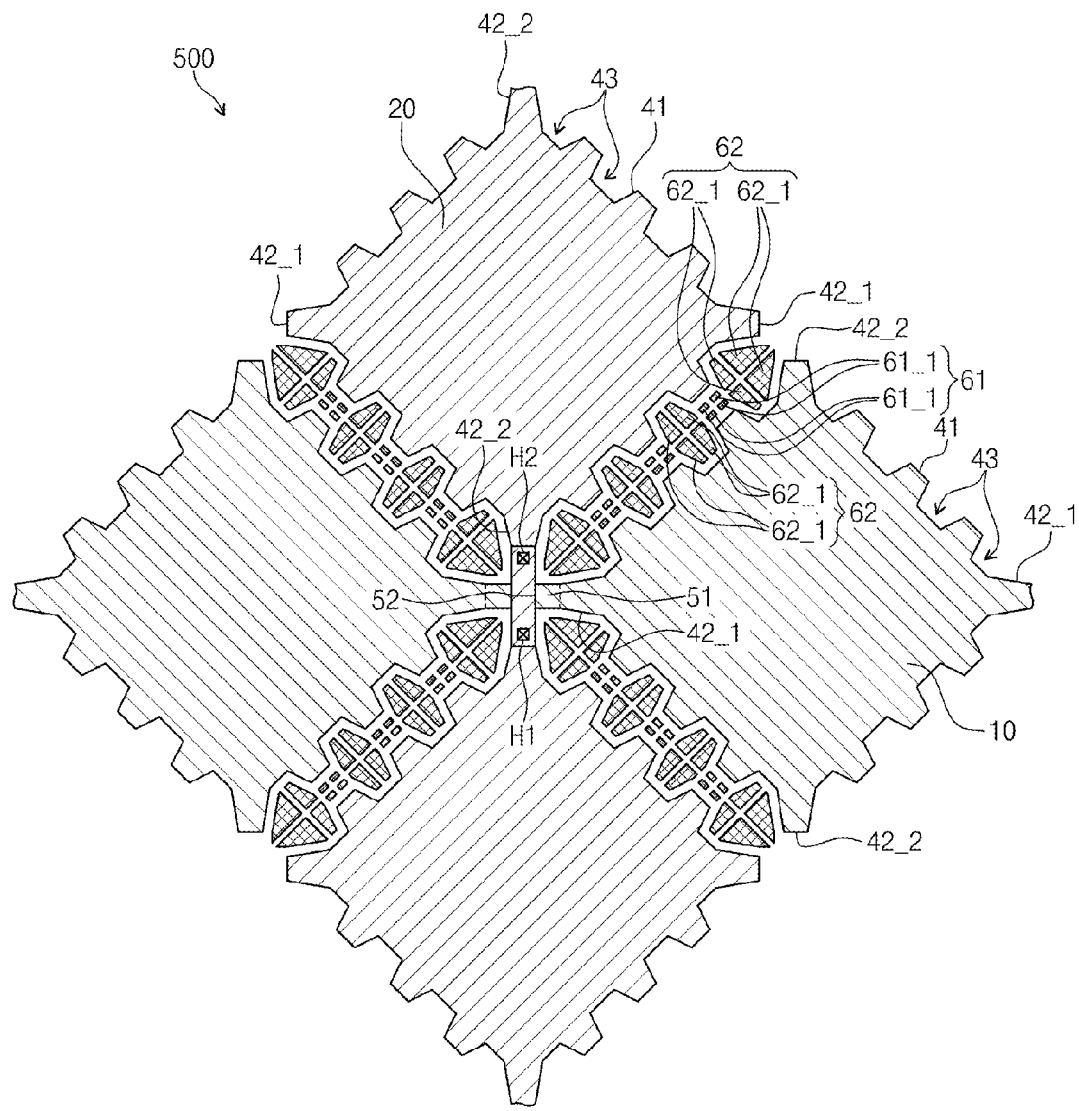
FIG. 13 is a plan view illustrating sensing electrodes of a touch panel according to an embodiment of the inventive concept.

FIG. 13 is a plan view illustrating sensing electrodes of a touch panel according to an embodiment of the inventive concept. For convenience of explanation, FIG. 13 illustrates two first sensing electrodes 10 adjacent to each other, two second sensing electrodes 20 adjacent to each other, first connecting electrode 51 connecting first sensing electrodes 10 to each other, and second connecting electrode 52 connecting second sensing electrodes 20 to each other. However, the structure illustrated in FIG. 13 may be repeatedly arranged in the active region of a touch panel 500 according to the present fifth embodiment.

Other features of touch panel 500 except conductive patterns may be the same as corresponding features of touch panel 300. Accordingly, the following description will focus on differences between touch panel 500 and touch panel 300.

Referring to FIG. 13, conductive patterns 61 and 62 of touch panel 500 comprise multiple first conductive patterns 61 and multiple second conductive patterns 62. Each of first conductive patterns 61 may include multiple first sub-conductive patterns 61_1. Each of second conductive patterns 62 may include multiple second sub-conductive patterns 62_2.

First sub-conductive patterns 61_1 of touch panel 300 are arranged in the left and right direction in a plan view. Alternatively, first sub-conductive patterns 61_1 of touch panel 500 may be arranged in the up and down direction and in the left and right direction in a plan view. Similarly, second sub-conductive patterns 62_1 of touch panel 300 is arranged in the left and right direction, but second sub-conductive patterns 61_2 of touch panel 500 is arranged in the up and down direction and in the left and right direction when viewed from a plan view.

Four first sub-conductive patterns 61_1 adjacent to each other are spaced apart from each other at an interval of fifth distance D5. Four second sub-conductive patterns 61_2 adjacent to each other are spaced apart from each other at an interval of fifth distance D5. However, the inventive concept is not limited thereto. In another embodiment, for instance, the distance between first sub-conductive patterns 61_1 adjacent to each other may be different from the distance between second sub-conductive patterns 62_1 adjacent to each other. Other features of touch panel 500 may be the same as corresponding elements of touch panel 300, so descriptions thereof are omitted.

Fifth capacitors C5 are formed between first sub-conductive patterns 61_1 adjacent to each other and between second sub-conductive patterns 62_1 adjacent to each other, respectively.

An electric field is generated in each of regions where fourth capacitors C4 and fifth capacitors C5 are formed. In other words, the electric fields may be generated to be dispersed in the regions where fourth and fifth capacitors C4 and C5 are formed. As described above, when the electric fields are dispersed in multiple regions, the uniformity of the electric field may be improved. Thus, touch panel 500 may improve the uniformity of the electric field to improve the touch accuracy.

Figure 14:
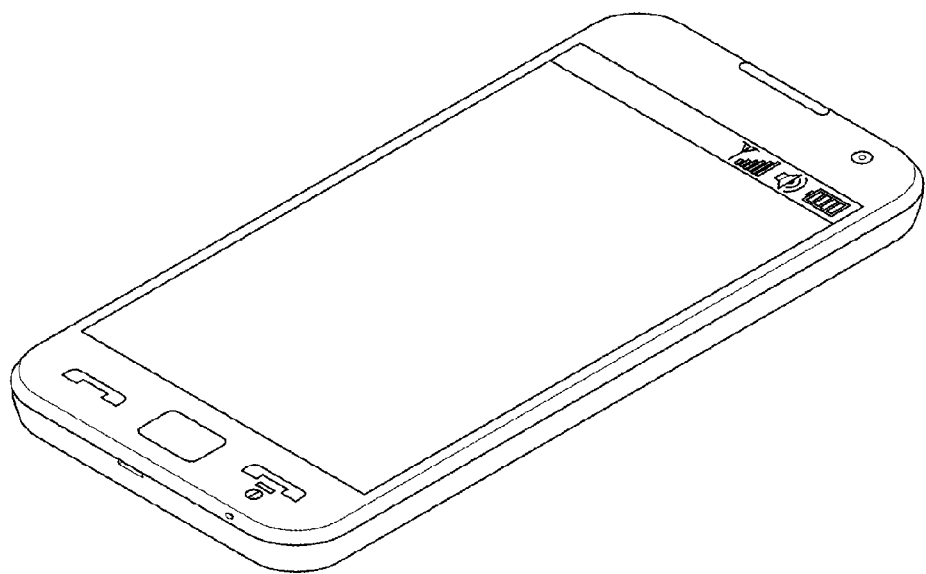
FIGS. 14 and 15 illustrate examples of multimedia devices comprising touch panels according to various embodiments of the inventive concept.
Figure 15:
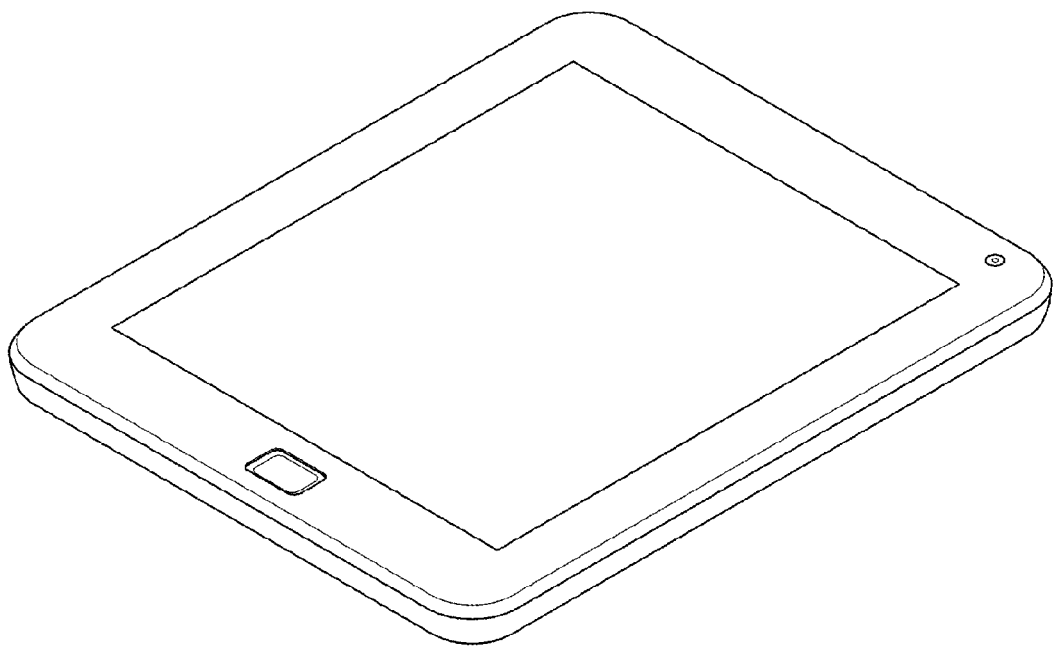

FIGS. 14 and 15 illustrate examples of multimedia devices comprising touch panels according to various embodiments of the inventive concept. The embodiments illustrated in FIGS. 14 and 15 may use one or more touch panels such as those described above in relation to FIGS. 1 through 13, for instance. As illustrated in FIG. 14, the touch panels may be applied to a mobile or smart phone 1000. As illustrated in FIG. 15, the touch panels may be applied to a tablet or smart tablet 2000.

The foregoing is illustrative of embodiments and is not to be construed as limiting thereof. Although a few embodiments have been described, those skilled in the art will readily appreciate that many modifications are possible in the embodiments without departing from scope of the inventive concept as defined in the claims.

What is claimed:

1. A touch panel, comprising:
   multiple first sensing electrodes constituting multiple rows, wherein the first sensing electrodes in each of the rows are electrically connected to each other;
   multiple second sensing electrodes constituting multiple columns crossing the rows, wherein the second sensing electrodes in each of the columns are electrically connected to each other; and
   multiple conductive patterns disposed between the first and second sensing electrodes,
   wherein each of the first and second sensing electrodes comprises multiple protrusions protruding outward from a corresponding boundary and multiple concave portions extending inward between the protrusions in a plan view;
   wherein pairs of protrusions extending from opposite sides of each of the first and second sensing electrodes are disposed opposite each other and are symmetrical to each other; and
   wherein the multiple conductive patterns are disposed between, and spaced apart from, pairs of protrusions and pairs of concave portions on the opposite sides of each of the first and second sensing electrodes.

2. The touch panel of claim 1, wherein each of the first and second sensing electrodes has a lozenge-shape, and wherein the protrusions comprise multiple first protrusions protruding outward from the opposite sides of the first and second sensing electrodes, and multiple second protrusions protruding outward from vertices of the first and second sensing electrodes.

3. The touch panel of claim 2, wherein the first protrusions of the first sensing electrodes and the first protrusions of the second sensing electrodes are disposed opposite each other and are symmetrical, and wherein each of the concave portions of the first sensing electrodes and each of the concave portions of the second sensing electrodes are opposite to each other and are symmetrical.

4. The touch panel of claim 3, wherein the conductive patterns comprise multiple first conductive patterns and multiple second conductive patterns;
   wherein each of the first conductive patterns is disposed between the first protrusions disposed opposite each other in the first and second sensing electrodes;
   wherein each of the second conductive patterns is disposed between the concave portions disposed opposite each other in the first and second sensing electrodes; and
   wherein the first conductive patterns and the second conductive patterns are spaced apart from each other and are alternately and repeatedly arranged between the first and second sensing electrodes.

5. The touch panel of claim 4, wherein each of the first protrusions has a trapezoidal shape in a plan view, and wherein each of the first conductive patterns is disposed between respective top sides of the opposite first protrusions of the first and second sensing electrodes.

6. The touch panel of claim 4, wherein a distance between the first conductive patterns and the first protrusions disposed opposite to each other in the first and second sensing electrodes, a distance between the second conductive patterns and an inner side of the concave portions disposed opposite to each other in the first and second sensing electrodes, and a distance between the first and second conductive patterns adjacent to each other are substantially equal to each other.

7. The touch panel of claim 4, wherein at least two of a distance between the first conductive patterns and the first protrusions disposed opposite to each other in the first and second sensing electrodes, a distance between the second conductive patterns and an inner side of the concave portions disposed opposite to each other in the first and second sensing electrodes, and a distance between the first and second conductive patterns adjacent to each other are different from each other.

8. The touch panel of claim 4, wherein each of the first conductive patterns comprises multiple first sub-conductive patterns spaced apart from each other.

9. The touch panel of claim 8, wherein each of the second conductive patterns comprises multiple second sub-conductive patterns spaced apart from each other.

10. The touch panel of claim 9, wherein a distance between the first conductive patterns and the first protrusions disposed opposite to each other in the first and second sensing electrodes, a distance between the second conductive patterns and an inner side of the concave portions disposed opposite to each other in the first and second sensing electrodes, a distance between the first and second conductive patterns adjacent to each other, a distance between the first sub-conductive patterns adjacent to each other, and a distance between the second sub-conductive patterns adjacent to each other are substantially equal to each other.

11. The touch panel of claim 9, wherein at least two of a distance between the first conductive patterns and the first protrusions disposed opposite to each other in the first and second sensing electrodes, a distance between the second conductive patterns and an inner side of the concave portions disposed opposite to each other in the first and second sensing electrodes, a distance between the first and second conductive patterns adjacent to each other, a distance between the first sub-conductive patterns adjacent to each other, and a distance between the second sub-conductive patterns adjacent to each other are different from each other.

12. The touch panel of claim 2, wherein the second protrusions comprise first sub-protrusions arranged in a row direction and second sub-protrusions arranged in a column direction.

13. The touch panel of claim 12, further comprising:
   first connecting electrodes each electrically connecting the first sub-protrusions of neighboring first sensing electrodes to each other; and
   second connecting electrodes each electrically connecting the second sub-protrusions of neighboring second sensing electrodes to each other, wherein the first connecting electrodes are disposed in a layer different from a layer in which the second connecting electrodes are disposed.

14. A touch panel, comprising:
multiple first sensing electrodes constituting multiple rows, wherein the first sensing electrodes in each of the rows are connected to each other; and
multiple second sensing electrodes constituting multiple columns crossing the rows, wherein the second sensing electrodes in each of the columns are connected to each other,
wherein each of the first and second sensing electrodes has a lozenge-shape in a plan view;
wherein the first and second sensing electrodes comprise:
multiple first protrusions protruding outward from opposite sides of the first and second sensing electrodes;
multiple second protrusions protruding outward from vertices of the first and second sensing electrodes; and
multiple concave portions depressed inward between the first protrusions and between the first and second protrusions adjacent to each other,
wherein the first protrusions of the first sensing electrodes and the first protrusions of the second sensing electrodes are disposed opposite each other and are symmetrical to each other;
wherein the concave portions of the first sensing electrodes and the concave portions of the second sensing electrodes are disposed opposite each other and are symmetrical to each other, and
wherein multiple conductive patterns are disposed between, and spaced apart from, pairs of first protrusions and pairs of concave portions on opposite sides of each of the first and second sensing electrodes.

15. The touch panel of claim 14, wherein each of the first and second protrusions has a trapezoidal shape in a plan view.

16. The touch panel of claim 14, wherein each of the first and second protrusions has a polygonal shape in a plan view.

17. The touch panel of claim 14, wherein each of the first and second protrusions has a curved shape in a plan view.

18. A touch panel, comprising:
first and second sensing electrodes connected to each other in a first direction via a first connecting electrode, wherein each of the first and second sensing electrodes has a boundary with multiple protrusions;
third and fourth sensing electrodes connected to each other in a second direction and connected to each other in a second direction via a second connecting electrode crossing the first connecting electrode, wherein each of the third and fourth sensing electrodes has a boundary with multiple protrusions disposed opposite corresponding protrusions on the respective boundaries of the first and second sensing electrodes; and
multiple conductive patterns disposed between, and spaced apart from, pairs of corresponding protrusions on opposite sides of each of the first, second, third and fourth sensing electrodes.

19. The touch panel of claim 18, wherein each of the first, second, third, and fourth sensing electrodes have opposite sides, and wherein pairs of protrusions on the opposite sides of each of the first, second, third, and fourth sensing electrodes are disposed opposite each other and are symmetrical to each other.

20. The touch panel of claim 18, wherein the protrusions have a trapezoidal shape, a polygonal shape, or a curved shape in a plan view.

* * * * *